United States Patent [19]
Schoen et al.

[11] Patent Number: 5,244,029
[45] Date of Patent: Sep. 14, 1993

[54] TIRE REMOVING MACHINE

[75] Inventors: Raimund Schoen, Carpi; Tullio Gonzaga, Correggio; Marco Matteucci, Reggio Emilia, all of Italy

[73] Assignee: Butler Engineering & Marketing S.r.l., Rio Saliceto, Italy

[21] Appl. No.: 673,670

[22] Filed: Mar. 22, 1991

[30] Foreign Application Priority Data

Mar. 23, 1990 [IT] Italy ............... 63222/90[U]

[51] Int. Cl.$^5$ .......................................... B60C 25/132
[52] U.S. Cl. .................................. 157/1.17; 157/1.22; 157/1.28; 157/1.3
[58] Field of Search .............. 157/1, 1.1, 1.17, 1.2, 157/1.22, 1.24, 1.26, 1.28, 1.3

[56] References Cited

U.S. PATENT DOCUMENTS

| | | |
|---|---|---|
| 3,717,193 | 2/1973 | Craft . |
| 3,742,999 | 7/1973 | Myers, Jr. ............... 157/1.17 |
| 3,786,852 | 1/1974 | Houston ............... 157/1.1 |
| 3,823,756 | 7/1974 | Rainey . |
| 4,183,392 | 1/1980 | Kane ............... 157/1.1 |
| 4,840,215 | 6/1989 | Vijay et al. ............... 157/1 |
| 4,846,239 | 7/1989 | Heller et al. ............... 157/1.3 |
| 4,884,611 | 12/1989 | Schmidt . |

FOREIGN PATENT DOCUMENTS

| | | |
|---|---|---|
| 63221B/89 | 2/1989 | Italy . |
| 1172303 | 2/1967 | United Kingdom . |
| 1402016 | 8/1975 | United Kingdom . |

Primary Examiner—James G. Smith
Attorney, Agent, or Firm—Scully, Scott, Murphy & Presser

[57] ABSTRACT

The tire removing machine has a resting base, a hollow support rigidly connected to the base and provided with a supporting flange for supporting motor vehicle wheels. A hollow securing shaft extends in the base and protrudes from the support, perpendicularly to the flange. A wheel centering and securing cone is anchored to the securing shaft outside the flange. A traction pin is rotatably accommodated in the shaft and extends beyond the centering cone where it ends in a traction head. A tool-holder bar with tool for mounting and removing a tire is at least temporarily coupled to the traction head.

3 Claims, 6 Drawing Sheets

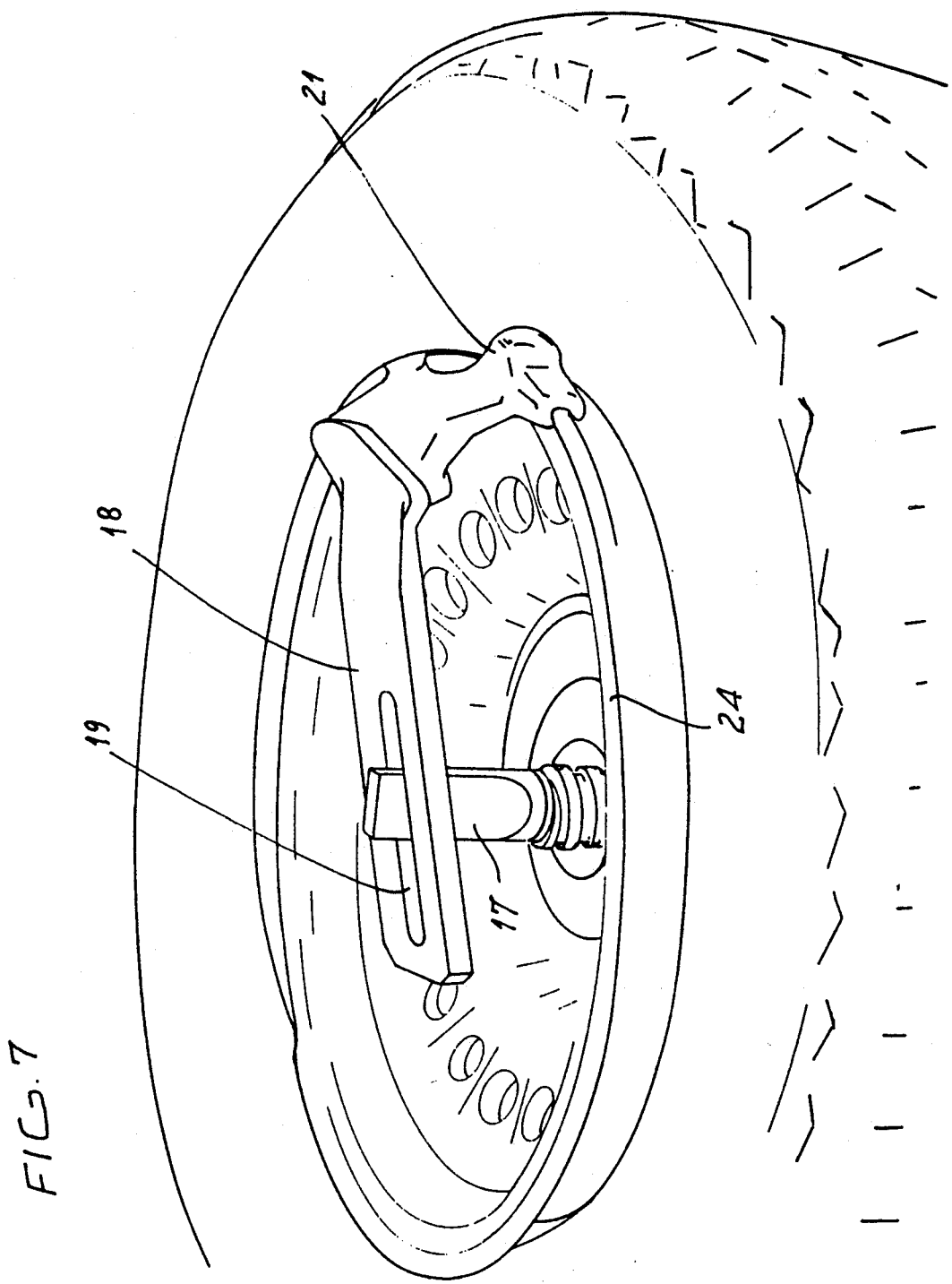

TIRE REMOVING MACHINE

BACKGROUND OF THE INVENTION

The present invention relates to a tire removing machine provided with a rotary mounting and removing tool, and with a bead extraction device.

The tire removing machine according to the present invention is particularly used for wheels provided with a central hole, which are particularly widespread in the U.S. market.

Tire removing machines are known in which, since one must operate on wheels which do not always have a central hole, the wheel is secured by means of steel brackets moved by generally pneumatic actuators which can abut on the wheel and rigidly associate it with a rotating support.

Mounting and removal occur by rotating the wheel with respect to a mounting and removing tool which is anchored to the base of the machine.

Such known machine, of the so-called European-type, can extract the bead, i.e. disconnect the tire from the wheel, which is an operation which must be performed prior to removal, and this leads to greater complexity in the operating procedure and to longer execution times for the removal of the tire from the wheel.

The so-called American-type machine performs the bead extraction operation, while the wheel is mounted on the securing device, by means of bead extractor fins which act simultaneously on the upper and lower bead of the tire.

This system, which has the advantage of being fast and effective, since it does not require intermediate steps between the bead extraction and removal operations, has the disadvantage that the force produced by the bead extraction fins causes a reaction of the securing device on the wheel which sometimes breaks the wheel itself, especially in the case of light-alloy wheels, which are increasingly widespread in use.

SUMMARY OF THE INVENTION

The aim of the present invention is to eliminate or substantially reduce the disadvantages described above by using the working method of the American-type machine as regards the removal and mounting operations and a conventional European-type bead extraction device which is arranged in a different position with respect to the one where removal and mounting are performed.

Within the scope of the above aim, a particular object of the invention is to use a considerably simplified wheel securing device.

Another important object is to reduce the execution times of the removal and mounting operations, since the proposed machine has no structures overlying the working surface, constituted by the wheel, which are such as to complicate the extraction of the tire or of the inner tube, and furthermore allows the removal/mounting of the lower bead immediately after/before the upper one without having to reposition the wheel between the two operations.

Another important object is to not provide substantial limitations to the width and diametric dimensions of the wheels which can be handled by a tire removing machine according to the invention.

Not least object is to provide a machine which is structurally very simple and ensures easy use for the operator and high reliability, and is competitive due to its modest production and operating costs.

This aim, these objects and others which will become apparent hereinafter are achieved, according to the invention, by a tire removing machine as defined in the appended claims.

Advantageously, the tire removing machine has a bead extraction device which comprises an arm which protrudes in a cantilevered manner from a side of said base and has one end pivoted thereto, so that it can perform angular oscillations, and has the other end provided with a bead extraction tool, a traction element anchored to an intermediate point of the arm, and actuation means for said traction element.

BRIEF DESCRIPTION OF THE DRAWINGS

Further aspects and advantages of the invention will become apparent from the following detailed description, given with reference to the accompanying drawings, wherein:

FIG. 7 is an axonometric view of the tool of FIGS. 5 and 6 applied to the machine of FIG. 1 or 3 during the removal of a tire from a wheel.

DESCRIPTION OF THE PREFERRED EMBODIMENTS

Figure 1:
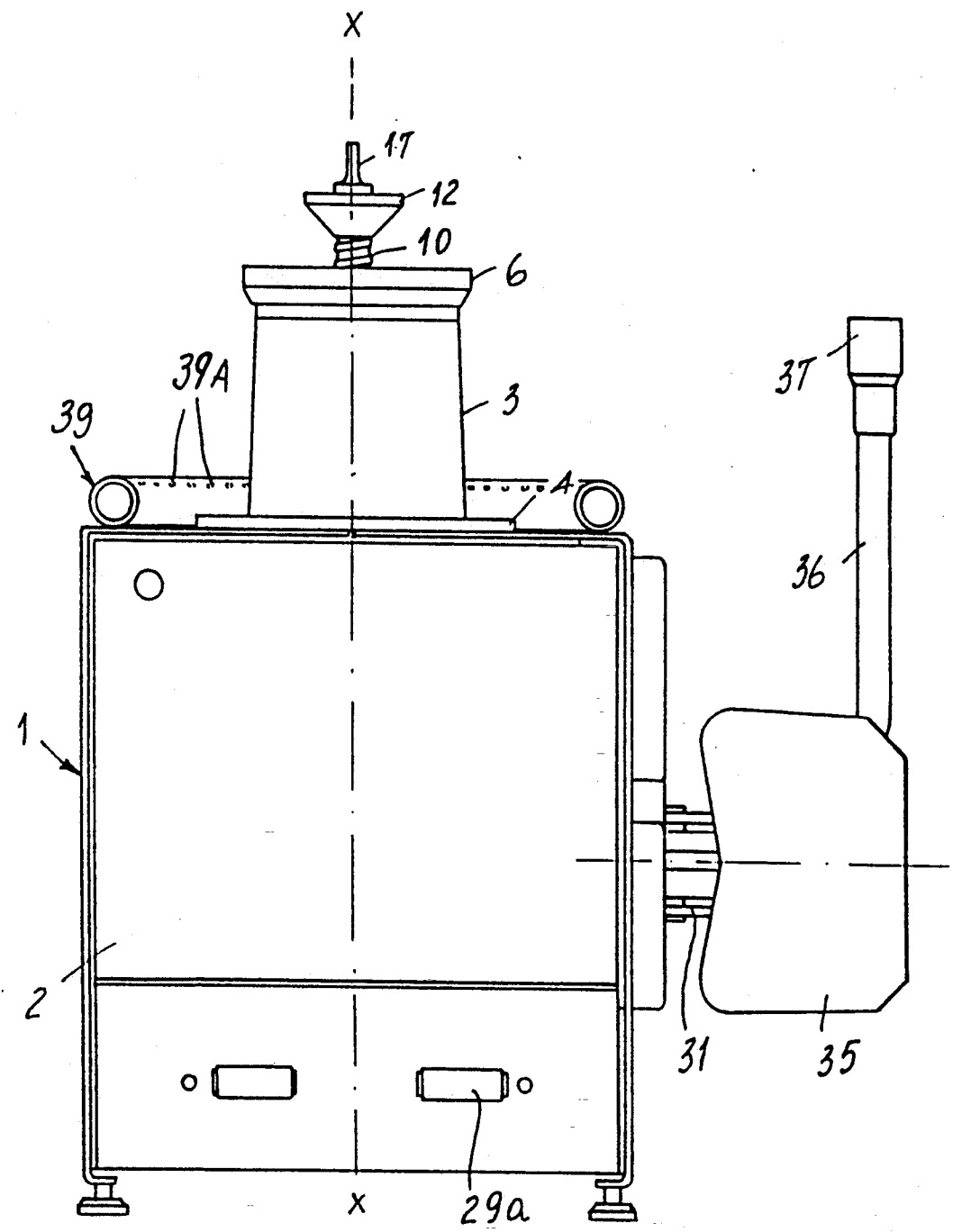
FIG. 1 is a front elevation view, partially in section, of a first embodiment of the tire removing machine according to the present invention.
Figure 2:
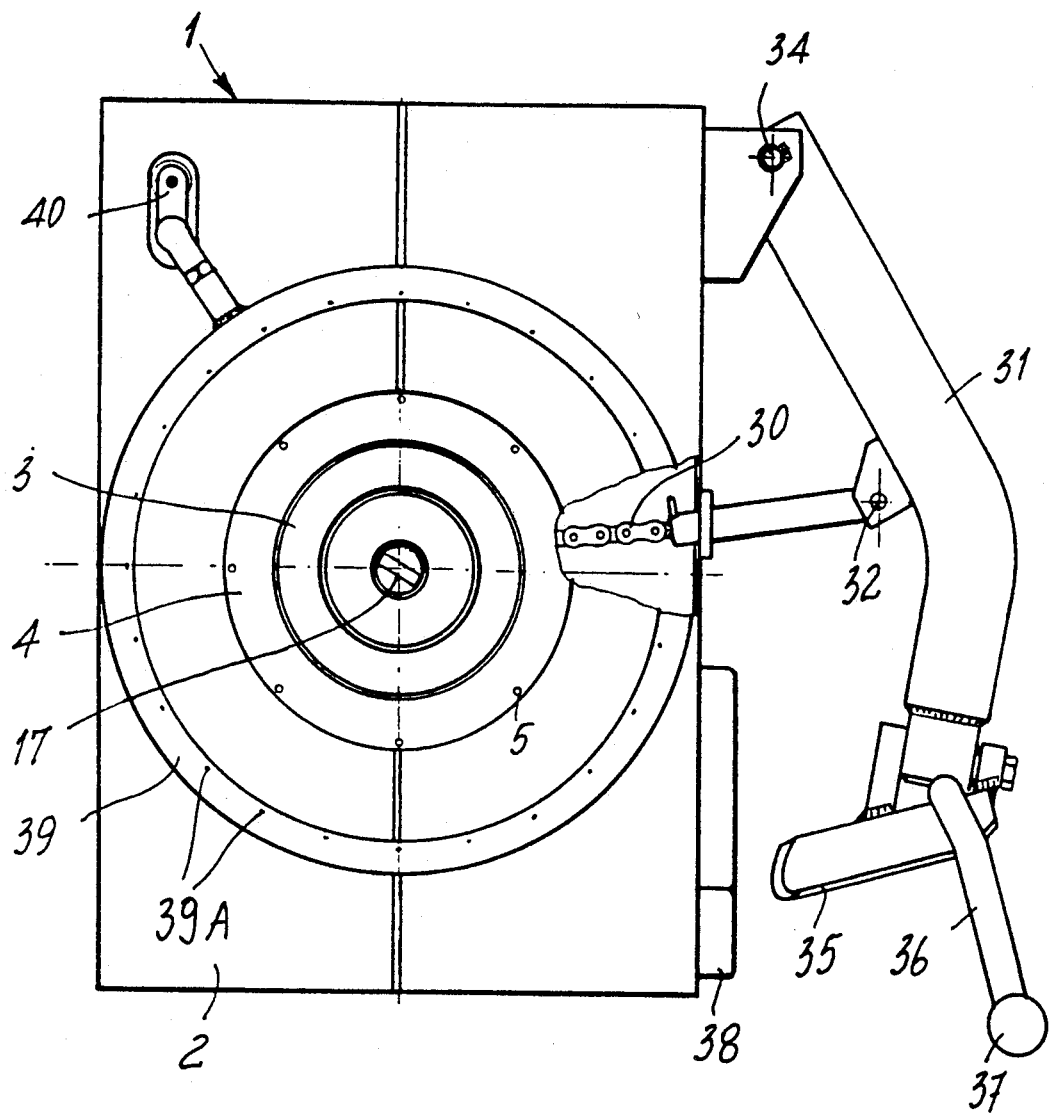
FIG. 2 is a partially sectional plan view of the machine of FIG. 1.

With reference initially to FIGS. 1, 2, 4, 5, 6 and 7, a first embodiment of the tire removing machine according to the invention, generally indicated by the reference numeral 1, comprises a base 2 on which a hollow support 3 is connected, for example by means of a coupling flange 4 which is fixed to the base by bolts 5; said support ends upward with a resting flange 6 which is for example mounted by means of radial bolts 7.

A wheel 8 can rest on the flange 6 with the interposition of a rubber ring 9.

An externally threaded hollow securing shaft 10 extends inside the support 3 coaxially thereto, and a cone 12 for centering and securing the wheel 8 on the flange 6 can be screwed thereon.

The shaft 10, together with the cone 12, is movable in both directions defined along its own longitudinal axis by appropriate actuation means, which can be constituted by an appropriately pressurized fluid-fed cylinder 13 and piston 14 associated with the shaft 10. The shaft is also biased upwardly (FIG. 4) by means of a spring 15; one end of said spring abuts against an expansion 10a of the shaft 10 and the other end abuts against an internal flange 3a of the support 3.

A traction pin 16 is rotatably accommodated inside the hollow shaft 10, and such pin is rotatable about its own longitudinal rotation axis X—X which coincides with the axis of the hollow support 3 and of the securing shaft 10. The pin 16 ends upward with a flattened head 17 to which a metallic bar 18 can be applied; said bar has a slot or opening 19 for insertion on the head, so as to be rigidly associated with the traction pivot 16 although it remains easily removable therefrom.

A tool 21 for mounting or removing tires 23 onto or from the wheel 8 is fixed to the bar 18 for example by means of bolts 18a. The bar 18 and the tool 21 constitute, in combination, a fixture 20 which is thus at least temporarily rigidly associated with the pin 16, and which can act on the bead of a tire at a rim 24 of the wheel. The tool 21 is made of anti-friction synthetic material, such as for example nylon, which opposes little friction to the sliding of the tool on the rim of the wheel and at the same time does not damage at all the wheel even if said wheel is made of a light alloy, for example an aluminum alloy.

Advantageously, the tool 21 can be a tool as disclosed in published Italian utility model Application no. 63221 B/89 in the name of the same applicant.

Figure 4:
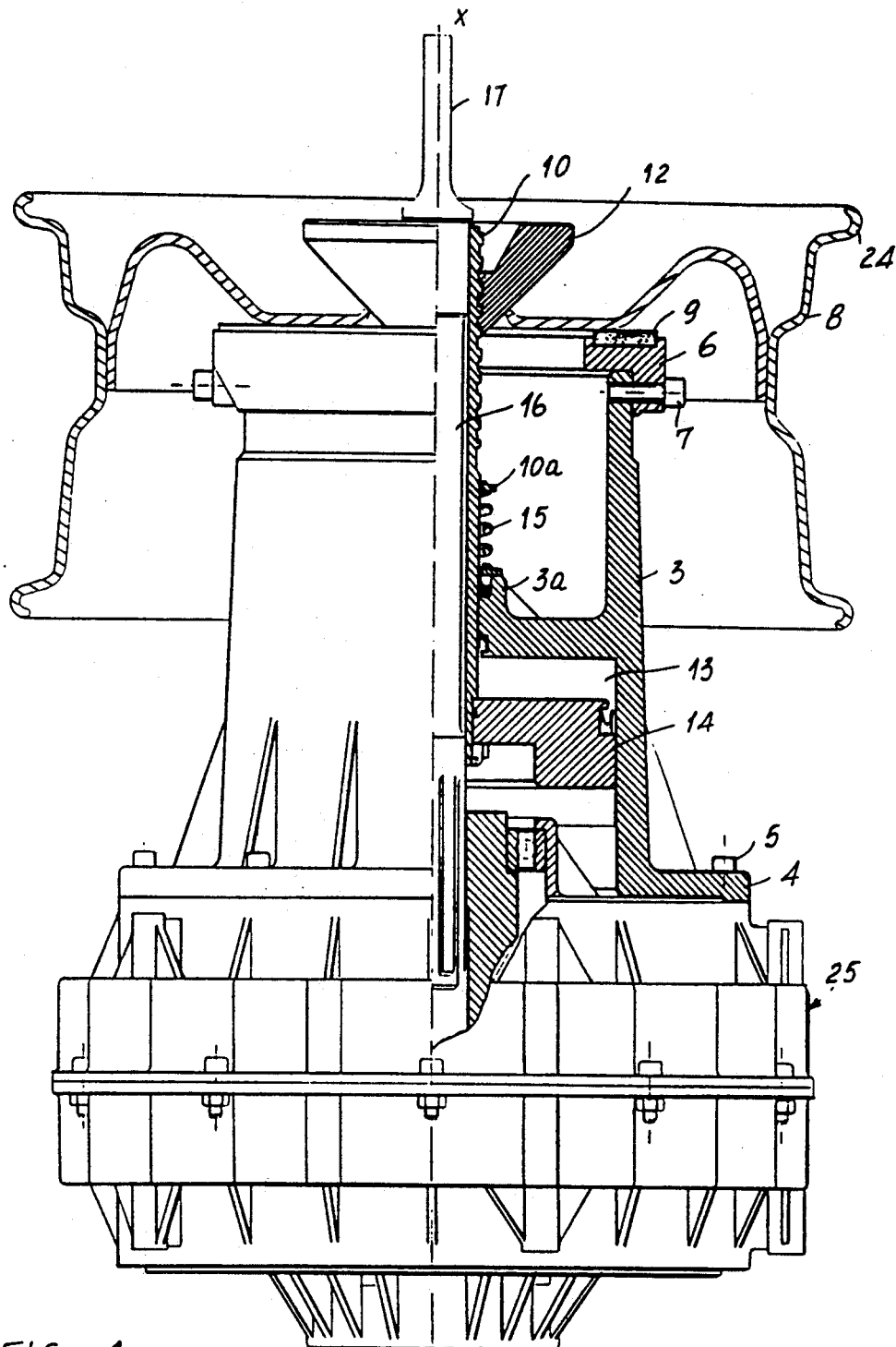
FIG. 4 is an enlarged-scale partially sectional view of a detail of the embodiment of the tire removing machine shown in FIG. 1.
Figure 4:
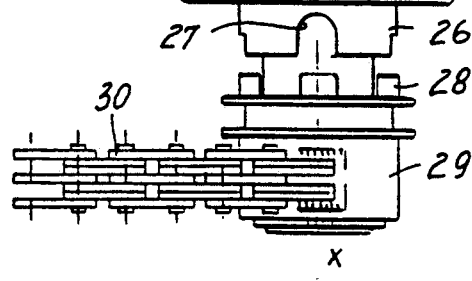
Figure 5:
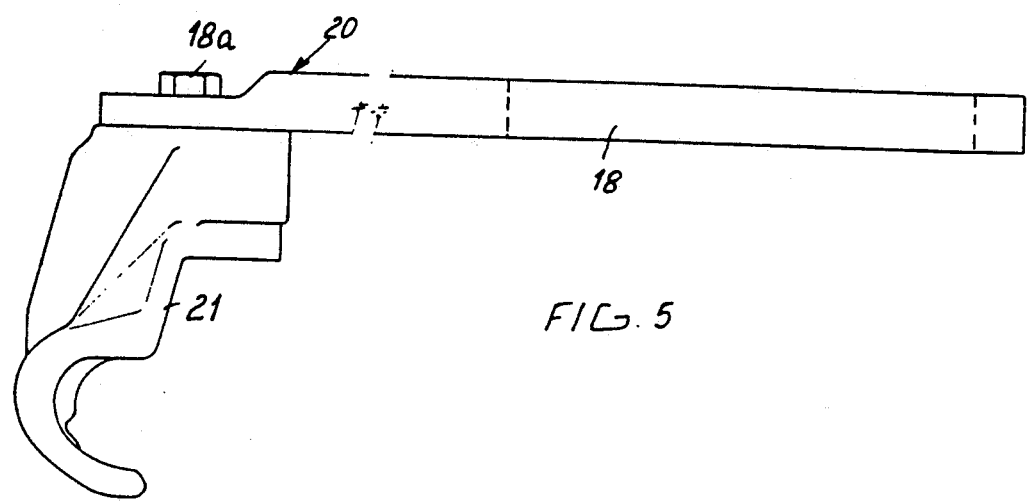
FIG. 5 is a side view of a tool with a related tool-holder which can be applied to the tire removing machine according to the present invention.
Figure 6:
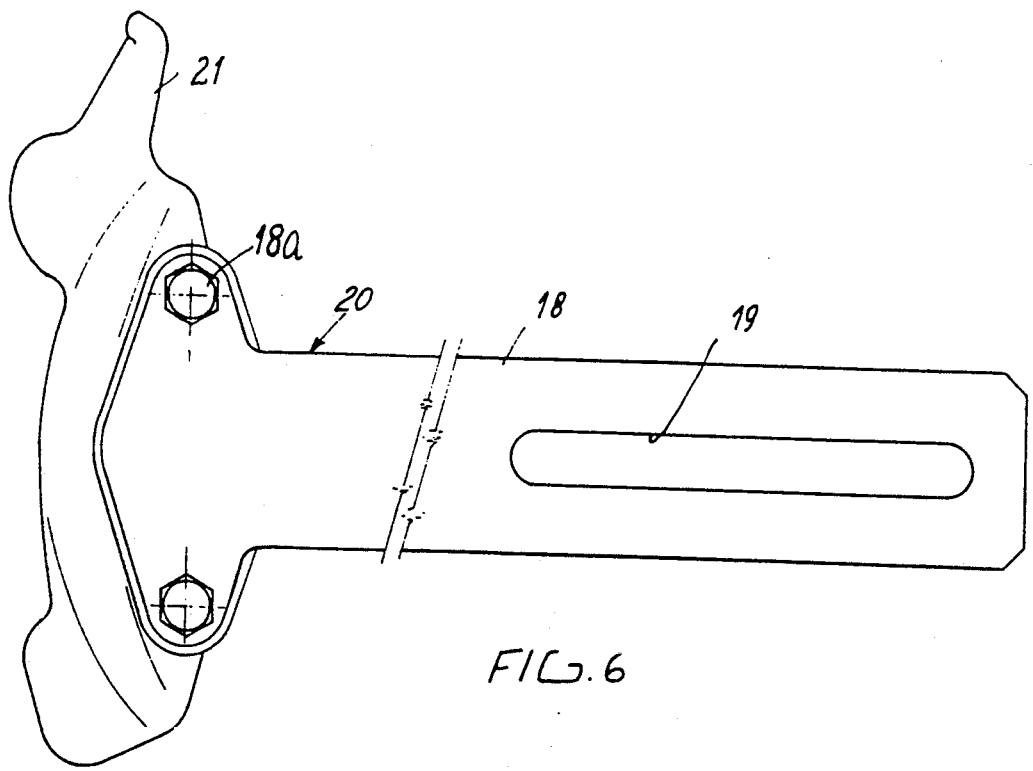
FIG. 6 is a plan view of the tool and tool-holder shown in FIG. 5.

The pin 16 can be rotated by a motor 25, appropriately drivingly connected thereto, as seen in FIG. 4. The casing of the motor 25 is arranged inside the base 2 and ends downward with a rotating tang 26 which has grooves or recesses 27 inside which the dowels 28 of a coupling head 29 can enter; said head 29 can be actuated into engagement with the tang 26 for example by a remote activation device, such as for example a pedal switch 29a. A chain or cable 30 can be connected peripherally to the coupling head 29 and transmits traction, upon rotation of the head 29, to a lateral arm 31 to which the chain 30 is fixed at an intermediate point 32 so as to pull it toward the base 2.

One of the ends of the arm 31 is pivoted at 34 to the base 2, whereas said arm supports, at its other end, a bead extraction tool 35 which can be pivoted, for example manually by means of an upright 36 provided with a handle 37, toward/away from a bead of a tire (not illustrated) which rests on the ground and which can be arranged upright adjacent to a lateral supporting plate 38 on the base 2.

A ring 39 for inflating tires, said ring being sized so as to be slightly larger in diameter than the wheels 8, can be provided coaxially to the hollow support 3.

Said ring 39 can advantageously be vertically raised in the axial X—X direction from an idle position, for example proximate to and within the base 2, to a working position which ends adjacent to the bead of the tubeless tire mounted on the wheel 8 when such wheel 8 rests on the flange 6.

The inflation ring 39 is hollow and is provided with a plurality of injection through holes 39A which are arranged in such a way as to be directed slightly radially inwardly with respect to the ring 39. The ring 39 can be internally fed with compressed air by means of appropriate compressed air delivery means and thus compressed air fed to the ring 39 would exit from the injection holes 39A.

The ring 39 can be raised and lowered by appropriate positioning actuation means for example constituted by a fluid-actuated piston and cylinder means interconnected between the ring 39 and, for example, the base 2.

The compressed-air delivery means and the fluid-actuated piston and cylinder means are indicated with the reference numeral 40 in the drawings.

The operation of the inflation ring 39 is as follows: upon mounting a wheel 8 with tire on the flange 6 and upon actuation of the positioning actuation means, the ring 39 will be raised to its working position in which, since such ring 39 is slightly larger in diameter than the wheel 8, it will engage against the tire lower side wall. A pushing action generated by the engagement of the ring 39 against the tire will cause the tire upper bead to engage against the upper rim 24 of the wheel 8, thereby securing an adequate seal therebetween, and the tire lower side wall will be so pushed as to provide an adequate opening through which, upon actuation of the compressed-air delivery means, compressed air will flow from the ring nozzles 39A. The compressed air fills the inside of the tire in a manner to cause the tire lower bead to engage against the lower rim of the wheel 8 and thereby create a circumferential seal between the tire and the wheel 8.

Figure 3:
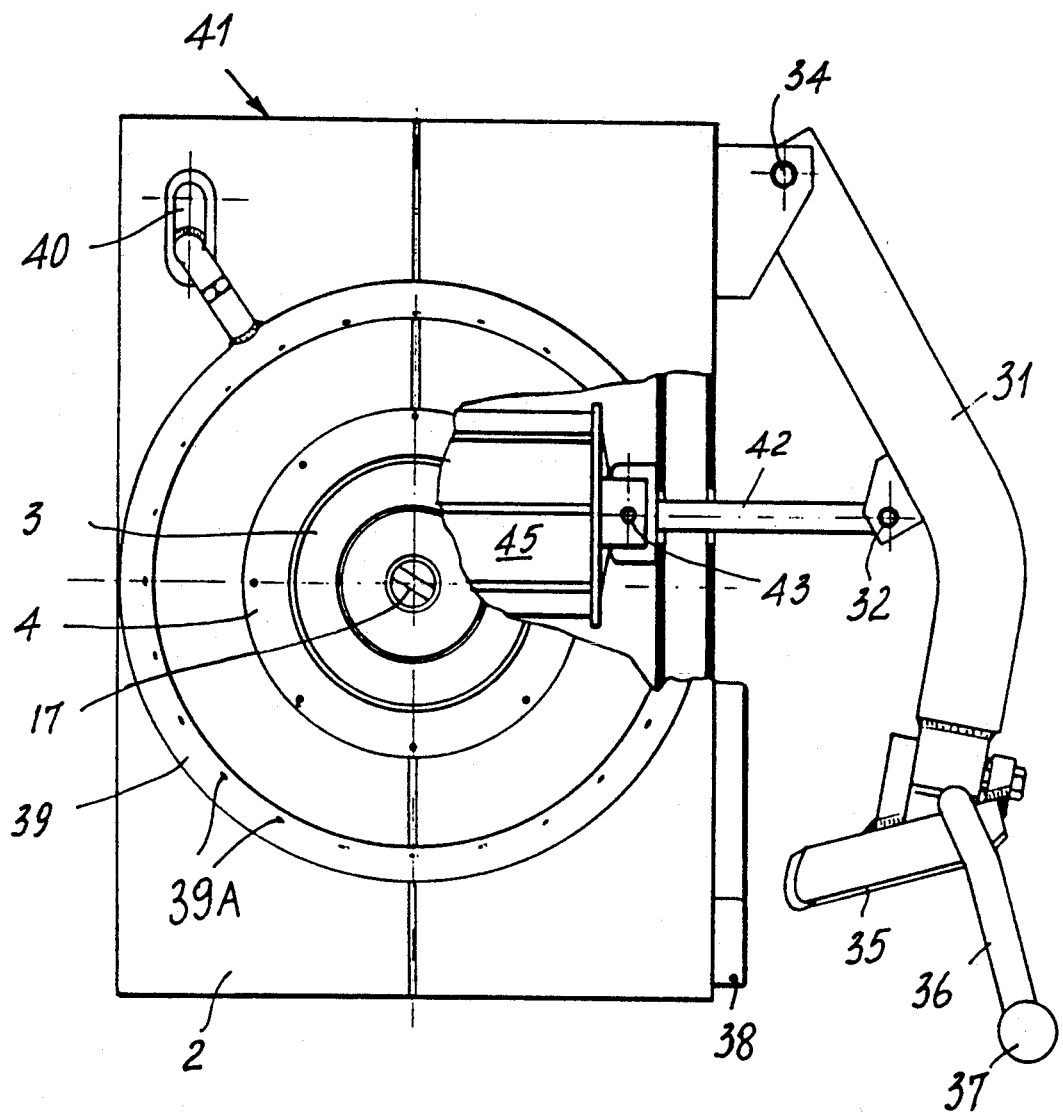
FIG. 3 is a partially sectional plan view of a further embodiment of the machine according to the present invention.

A further embodiment of the tire removing machine described above, illustrated in FIG. 3 and generally indicated by the reference numeral 41, differs in the means which actuate the arm 31.

A traction element 42 is pivoted at 32 to the arm 31 and is in turn anchored at 43, within the base 2, to an appropriate fluid-actuated unit 45 with cylinder and piston.

The operation of the above described tire removing machine is extremely simple. With reference for example to a tire removal operation, a motor vehicle wheel with tire attached thereto is placed on the ground at the plate 38 by an operator, then the bead extraction tool 35 is moved toward the wheel by actuating the handle 37 until the tool 35 is moved into contact with the tire bead.

The operator then actuates a control, for example a pedal 29a, which causes, in the case of the tire removing machine 1, the insertion engagement of the head 29 in the tang 26 and the subsequent startup of the motor causes the transmission of the rotary motion of said tang to the chain or cable 30 (which is wound on the coupling head 29) which acts as traction element, causing the approach of the arm 31 toward the plate 38 and a compression of the tool against the bead of the tire, which is thus extracted.

In the tire removing machine 41, instead, during the bead extraction operation the arm 31 is actuated by the traction force produced by the fluid-actuated unit 45.

Once the bead extraction operation has been performed, the operator places the wheel on the supporting flange 6; the wheel is then secured to the hollow support 3, after screwing the cone 12, as a consequence of the downward motion of the piston 14 and therefore of the hollow shaft 10.

Once securing has been performed, the operator applies the bar 18 with the tool 21 on the head 17, and by means of an appropriate control starts the rotation of the motor 25 and consequently of the pivot 16 and of the tool 21, which can thus extract or fit the bead of the tire from or onto the rim 24 of the wheel, as illustrated in FIG. 7.

The invention thus conceived is susceptible to numerous modifications and variations which would be included within the protective scope of the invention as defined in the appended claims.

In practice, the materials employed, as well as the dimensions, may be various according to the requirements.

Practical tests have shown that a tire removing machine according to the invention allows to provide a working surface defined by the upper part 24 of the rim of a wheel, which even with wheels of different widths is at a constant height on the hollow support 3, to the full advantage of the operations which the machine must perform and of the operator, who always works at the same level.

This is due to the fact that the wheel rests on the flange 6 at the central flat surface of the wheel 8.

Said wheel can vary in width, always inward, so that the working surface 24 does not vary its level. One should furthermore note the advantage of being able to apply to the tire removing machine according to the invention a removing and mounting tool, for example the one described and indicated by the reference numeral 21, made of plastic material and manufactured specifically to operate on the tire by reacting on the rim 24 of the wheel without causing, by virtue of the shape and softness of the material by which it is constituted, any damage on said wheel.

We claim:

1. A tire removing machine comprising:
   a ground resting base;
   a hollow support rigidly supported by said ground resting base, the hollow support being provided with a supporting flange for supporting a motor vehicle wheel;
   a hollow securing shaft supported inside said hollow support, the hollow securing shaft extending axially inside said hollow support and protruding above said supporting flange;
   a cone for centering and securing the motor vehicle wheel, said cone being screwed about said hollow securing shaft above said supporting flange;
   a pin rotatably supported inside said hollow securing shaft, said pin extending out of said hollow securing shaft above said supporting flange and being provided thereat with a traction head;
   a tool-holder bar for holding a tool for mounting and removing a tire from the motor vehicle wheel; the tool-holder bar being at least temporarily coupled to said traction head and extending therefrom in a cantilevered manner to a rim of the motor vehicle wheel;
   a motor operatively connected to said pin for rotating said pin;
   a bead extraction device comprising an arm pivotally supported by said ground resting base and bead extraction tool connected to said arm;
   a tang rotatably driven by said motor;
   a coupling head movable into engagement and disengagement with said tang; and
   a traction element interconnected between said coupling head and said arm of said bead extraction device.

2. A tire removing machine according to claim 1, wherein the hollow securing shaft is slidably mounted axially in said hollow support and wherein the tire removing machine further comprises:
   a cylinder formed by said hollow support;
   a piston slidably mounted in said cylinder, said piston being rigidly connected to a lower end of said hollow securing shaft;
   spring means for biasing said hollow securing shaft into an upper position; and
   means for moving said piston in said cylinder.

3. A tire removing machine comprising:
   a ground resting base;
   a hollow support rigidly supported by said ground resting base, the hollow support being provided with a supporting flange for supporting a motor vehicle wheel;
   a hollow securing shaft supported inside said hollow support, the hollow securing shaft extending axially inside said hollow support and protruding above said supporting flange;
   a cone for centering and securing the motor vehicle wheel, said cone being screwed about said hollow securing shaft above said supporting flange;
   a pin rotatably supported inside said hollow securing shaft, said pin extending out of said hollow securing shaft above said supporting flange and being provided thereat with a traction head;
   a tool-holder bar for holding a tool for mounting and removing a tire from the motor vehicle wheel; the tool-holder bar being at least temporarily coupled to said traction head and extending therefrom in a cantilevered manner to a rim of the motor vehicle wheel;
   a motor for rotating said pin; wherein the hollow securing shaft is slidably mounted axially in said hollow support and wherein the tire removing machine further comprises:
   a cylinder formed by said hollow support;
   a piston slidably mounted in said cylinder, said piston being rigidly connected to a lower end of said hollow securing shaft;
   spring means for biasing said hollow securing shaft into an upper position; and
   means for moving said piston in said cylinder.

* * * * *